United States Patent
Keller et al.

(10) Patent No.: US 12,039,642 B2
(45) Date of Patent: Jul. 16, 2024

(54) RETICLE ALIGNMENT

(71) Applicant: Vuzix Corporation, West Henrietta, NY (US)

(72) Inventors: Brent Keller, Rochester, NY (US); Paul J. Travers, Honeoye Falls, NY (US); Adam C. Gogolski, Fairport, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 18/029,912

(22) PCT Filed: Oct. 1, 2021

(86) PCT No.: PCT/US2021/053209
§ 371 (c)(1),
(2) Date: Apr. 2, 2023

(87) PCT Pub. No.: WO2022/072854
PCT Pub. Date: Apr. 7, 2022

(65) Prior Publication Data
US 2023/0360290 A1 Nov. 9, 2023

Related U.S. Application Data

(60) Provisional application No. 63/087,102, filed on Oct. 2, 2020.

(51) Int. Cl.
*G06T 3/40* (2024.01)
*G02B 27/01* (2006.01)
(Continued)

(52) U.S. Cl.
CPC ........ *G06T 11/203* (2013.01); *G02B 27/0172* (2013.01); *G06T 3/20* (2013.01);
(Continued)

(58) Field of Classification Search
CPC . G06T 11/203; G06T 3/20; G06T 3/40; G06T 2210/12; H04N 23/67;
(Continued)

(56) References Cited

U.S. PATENT DOCUMENTS 5,189,560 A 2/1993 Edwards et al.
10,567,641 B1 * 2/2020 Rueckner ............... H04N 23/62
(Continued)

FOREIGN PATENT DOCUMENTS

WO 2019040736 A1 2/2019

OTHER PUBLICATIONS

United States Patent & Trademark Office (ISA/US), International Search Report and Written Opinion in PCT/US2021/053209, dated Dec. 27, 2021, 6 pages.

*Primary Examiner* — Robert J Michaud
(74) *Attorney, Agent, or Firm* — Harter Secrest & Emery LLP; Jacob D. Merrill, Esq.

(57) ABSTRACT

A head-mounted display system, including an image source operable to generate image-bearing light, a near-eye display operable to convey the image-bearing light beams to an eyebox within which a virtual image can be viewed, a camera located adjacent to the near-eye display, wherein the camera has a center of focus, and a processing unit operable to output signals to the image source, wherein the processing unit is operable form a reticle within the virtual image via the image source and dynamically position the reticle at the camera center of focus.

17 Claims, 16 Drawing Sheets

(51) Int. Cl.
*G06T 3/20* (2006.01)
*G06T 11/20* (2006.01)
*H04N 23/67* (2023.01)

(52) U.S. Cl.
CPC ............... *G06T 3/40* (2013.01); *H04N 23/67* (2023.01); *G02B 2027/014* (2013.01); *G02B 2027/0178* (2013.01); *G06T 2210/12* (2013.01)

(58) Field of Classification Search
CPC .......... G02B 27/0172; G02B 2027/014; G02B 2027/0178
See application file for complete search history.

(56) References Cited

U.S. PATENT DOCUMENTS

| | | |
|---|---|---|
| 2007/0183646 A1 | 8/2007 | Beaty et al. |
| 2018/0249151 A1 | 8/2018 | Freeman et al. |
| 2018/0267605 A1 | 9/2018 | Border |
| 2019/0130622 A1 | 5/2019 | Hoover et al. |

\* cited by examiner

RETICLE ALIGNMENT

TECHNICAL FIELD

The present disclosure relates generally to electronic AR/VR displays and more particularly to displays utilizing an image light guide operable to display a reticle or bounding box.

BACKGROUND

Virtual image near-eye display systems are being developed for a range of diverse uses, including military, commercial, industrial, fire-fighting, and entertainment applications. For many of these applications, there is value in forming a virtual image that can be visually superimposed over the real-world image that lies in the field of view of the user. An optical image light guide may convey image-bearing light to a viewer in a narrow space for directing the virtual image to the viewer's pupil and enabling this superimposition function.

The calibration of virtual image near-eye display systems found in head-mounted displays (HMDs) and other applications for individual wearers can be difficult, as interpupillary distance and personal preference differ for every operator. The present disclosure provides, inter alia, an optical alignment system including a reticle that enables an operator to align a camera view and real world view, without relying on a preview image to iteratively correct for parallax errors.

SUMMARY

The present disclosure provides for a system and method of displaying and calibrating a virtual image reticle.

In a first embodiment, the present disclosure provides a head-mounted display system, including an image source operable to generate image-bearing light, a near-eye display operable to convey the image-bearing light beams to an eyebox within which a virtual image can be viewed, a camera located adjacent to the near-eye display, wherein the camera has a center of focus, and a processing unit operable to output signals to the image source, wherein the processing unit is operable form a reticle within the virtual image via the image source and dynamically position the reticle at the camera center of focus.

The reticle may be, without limitation, a crosshair or bounding box, and may have its color and shape configured to the preferences of the user. The present disclosure further provides a method of calibrating a head mounted near-eye display that ensures a level of mechanical alignment of a camera.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1A:
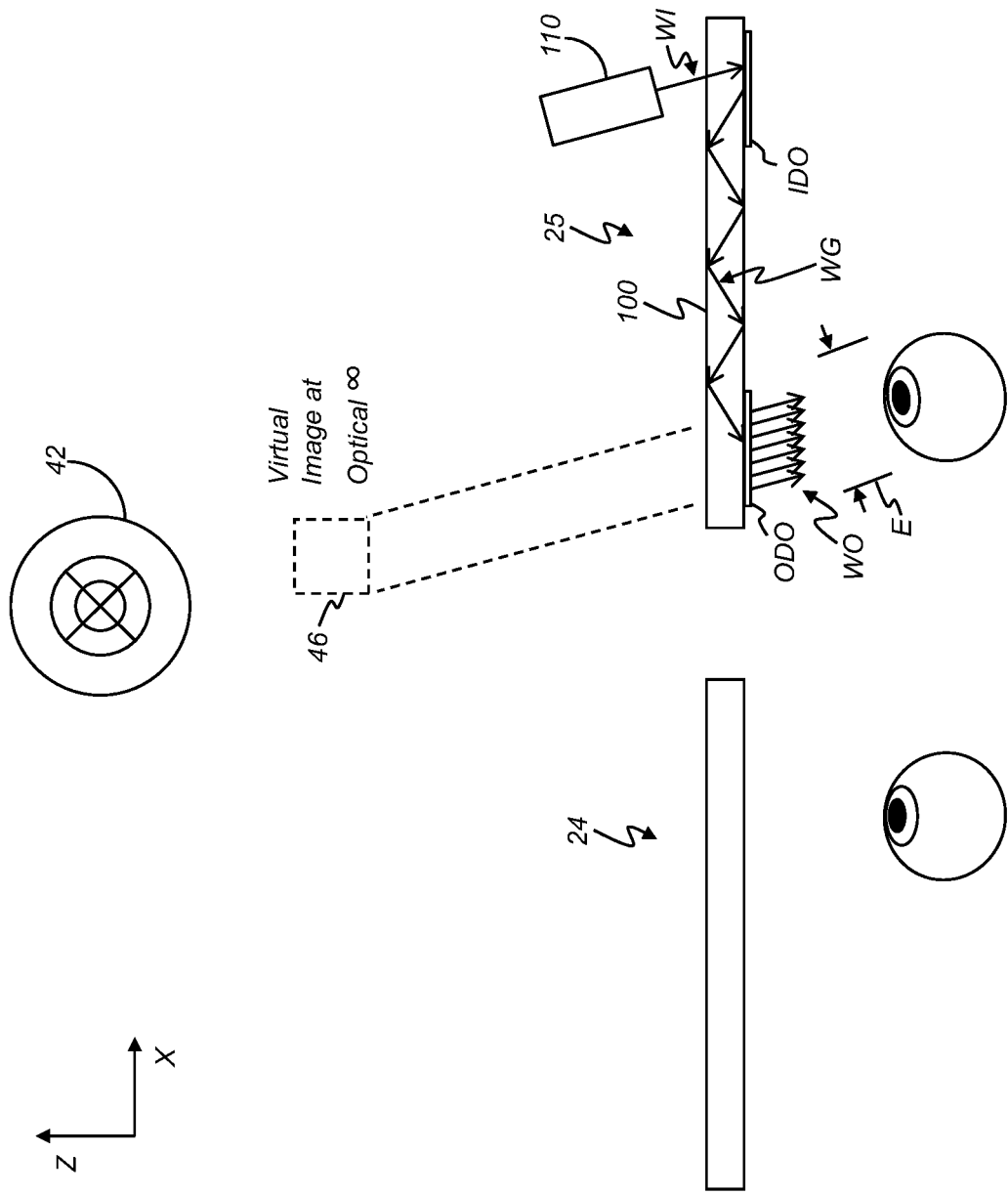
FIG. 1A illustrates a schematic top view of an image light guide having an in-coupling diffractive optic and out-coupling diffractive optic providing an expanded eyebox for the viewer according to an exemplary embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first," "second," and so on, do not necessarily denote any ordinal, sequential, or priority relation, but are simply used to more clearly distinguish one element or set of elements from another, unless specified otherwise.

Where used herein, the term "exemplary" is meant to convey "an example of," and is not intended to suggest any preferred or ideal embodiment.

Where used herein, the terms "viewer," "operator," "observer," and "user" are considered to be equivalent and refer to the person or machine viewing virtual images conveyed by the head mounted near-eye display system.

Where used herein, the term "set" refers to a non-empty set, as the concept of a collection of elements or members of a set is widely understood in elementary mathematics. The term "subset," unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Where used herein, the term "reticle" refers to a virtual image that is generated by a projector/image source of a near-eye display system. The reticle may take the shape of, but is not limited to, a crosshair, pointer, bounding box or other visually identifiable form, that may be visually superimposed over a real object or virtual image, that may be used in the execution of commands issued from the head mounted near-eye display system. The bounding box may show the outer edges of the virtual image, or simply a center alignment point. The size and shape of the bounding box may be adjusted in the virtual image as the zoom level of the camera is adjusted.

An optical system, such as a head mounted near-eye display system, can produce a virtual image via an image source. In contrast to methods for forming a real image, a virtual image is not formed on a display surface. That is, if a display surface were positioned at the perceived location of a virtual image, no image would be formed on that surface. Virtual images have a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

Turning now to the drawings, head mounted near-eye display systems have a range of diverse uses, including military, commercial, industrial, fire-fighting, and entertainment applications. As described herein, a head mounted near-eye display system is operable to form a virtual color image that can be visually superimposed over the real-world that lies in the field of view of the head mounted near-eye display system user. Referring now to FIG. 1A, an optically transparent flat parallel plate waveguide 100, also called a planar waveguide, conveys image-bearing light WI generated by a polychromatic, or monochromatic, projector system 110 to the HMD user. The planar waveguide 100 may convey the image-bearing light WI in a narrow space to direct the image to the HMD user's pupil and enable the superposition of a virtual image 46 over a real object that lies in the field of view of the HMD user.

Collimated, relatively angularly encoded light beams from the color image projector source 110 may be coupled into the optically transparent planar waveguide 100 by an input coupling optic, such as an in-coupling diffractive optic IDO, which can be mounted or formed on a surface of the parallel plate planar waveguide 100 or disposed within the waveguide 100. Such diffractive optics can be formed as, but are not limited to, diffraction gratings or holographic optical elements. For example, the diffraction grating can be formed as a surface relief grating. After propagating along the planar waveguide 100, the diffracted color image-bearing light WG can be directed back out of the planar waveguide 100 by a similar output coupling optic, such as an out-coupling diffractive optic ODO, which may be arranged to provide pupil expansion along one or more directions. In addition, one or more diffractive turning gratings may be positioned along the waveguide 100 optically between the input and output gratings IDO, ODO to provide pupil expansion in one or more directions. The image-bearing light WO output from the parallel plate planar waveguide 100 provides an expanded eyebox E for the viewer. The waveguide 100 is illustrated in the right eye assembly 25 of the head mounted near-eye display system, but may be positioned in the left eye assembly 24 or both eye assemblies 24, 25.

Figure 1B:
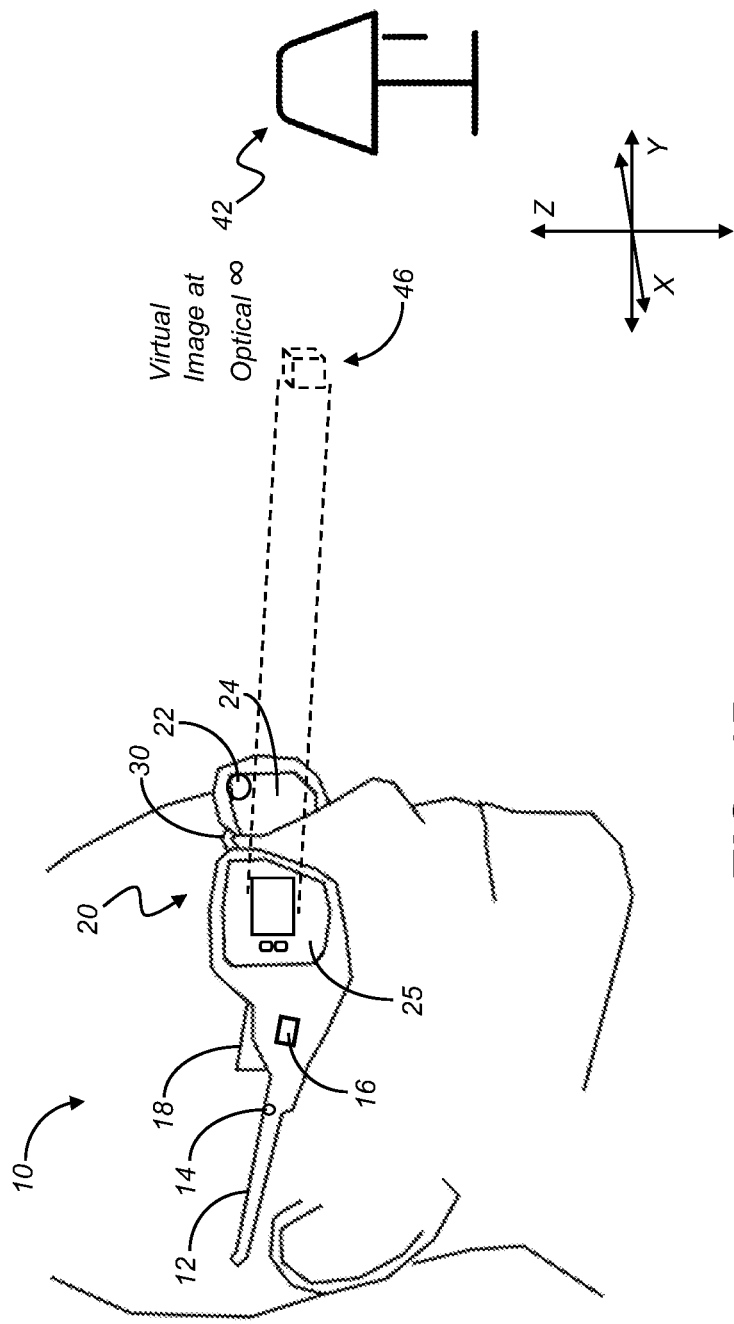
FIG. 1B illustrates a schematic of a person wearing a head mounted display (HMD) according to an exemplary embodiment of the presently disclosed subject matter.

FIG. 1B illustrates a head mounted near-eye display system 20 in the form of eye glasses (i.e., smart glasses) in one embodiment of the reticle system. The head mounted near-eye display system 20 may include at least a right temple arm 12 and a processing unit 18 having a memory for storing data, storing computer programs, storing computer apps., and for executing the computer programs and apps. The head mounted near-eye display system 20 software stored, for example, in the processing unit 18, is operable to generate, control, and perform the processing of operator 10 commands. The processing unit 18 may be connected to an input device 16 and/or user input button 14. The input device 16 is operable to convey user input to processing unit 18. In an embodiment, the input device 16 is a touchpad or touch sensor. The touch sensor 16 is operable to receive input from one or more fingers of a user 10 and/or input from a stylus. Persons skilled in the relevant arts will recognize that where an input gesture is described as being performed by a finger of the operator 10, the input gesture may also be performed by a stylus. A gesture received by the touch sensor 16 may include, without limitation, tapping the touch sensor 16, swiping/dragging across the touch sensor 16 in a front-to-rear direction, swiping/dragging across the touch sensor 16 in a rear-to-front direction, swiping/dragging across the touch sensor 16 in a top-to-bottom direction, swiping/dragging across the touch sensor 16 in a bottom-to-top direction, swiping/dragging across the touch sensor 16 in a front-to-rear and rear-to-front direction simultaneously (e.g., a pinching motion), and vice versa, swiping/dragging across the touch sensor 16 in a bottom-to-top and a top-to-bottom direction simultaneously, and vice versa, swiping/dragging across the touch sensor 16 in a front-to-rear-to-front direction, swiping/dragging across the touch sensor 16 in a rear-to-front-to-rear direction, and swiping/dragging across the touch sensor 16 in a bottom-to-top-to-bottom direction, and swiping/dragging across the touch sensor 16 in a top-to-bottom-to-top direction. The touch sensor 16 may further detect whether one finger, two fingers, or three fingers are utilized during the gesture. In an embodiment, a user input button 14 is operable to convey commands to processing unit 18. In another embodiment, the operator 10 can send commands via a handheld device or voice input. The processing unit 18 may convert the operator 10 interaction with the user input button 14, or the sequence of gestures into a sequence of symbols suitable for comparison with a stored sequence of symbols used to control certain operations on the device, including turning on/off the camera, camera focus, displaying and hiding the virtual image, enabling or disabling computer programs, controlling computer programs, enabling or disabling visual guides, controlling visual guides, selecting and controlling menu items, selecting and controlling networked real world objects and devices 42, and the like.

The head mount near-eye display system 20 may include augmented reality (AR) monocular or binocular smart glasses having the ability to display virtual images 46 to the wearer's eye(s). The head mount near-eye display system 20 may be connected to an external processing unit (e.g., a smart phone) that may run software to, at least in part, control the display of said virtual image(s) 46 and/or the display of a reticle in the virtual image 46 in addition to, or as an alternative to, the processing unit 18.

The head mounted near-eye display system 20 may show a virtual image 46 preview of what the camera 22 sees. The camera 22 may be operable via a user input button 14, touch sensor 16, gestures, or verbal commands to enable the operator 10 to initiate a plurality of tasks including taking photos, recording video, two way calling, scanning barcodes, selecting and controlling networked real world objects and devices 42, and the like.

In an embodiment, the head mounted near-eye display system 20 may further comprise at least one camera 22 situated to view hand gestures of the user 10, and real objects in the FOV. In an embodiment, the camera 22 is located adjacent to the outer periphery of the left or right eye assembly 24, 25 of the head mounted near-eye display system. The camera 22 FOV is generally located in front of the operator 10. In another embodiment, the camera 22 is located in the left or right temple arm 12 of the head mounted near-eye display system 20. The camera 22 FOV is generally positioned facing to the front of the operator 10. In another embodiment, the camera 22 or additional cameras may augment the head mounted near-eye display system 20 FOV with additional orientations such as areas above, behind, or to the side of the operator 10.

Figure 2A:
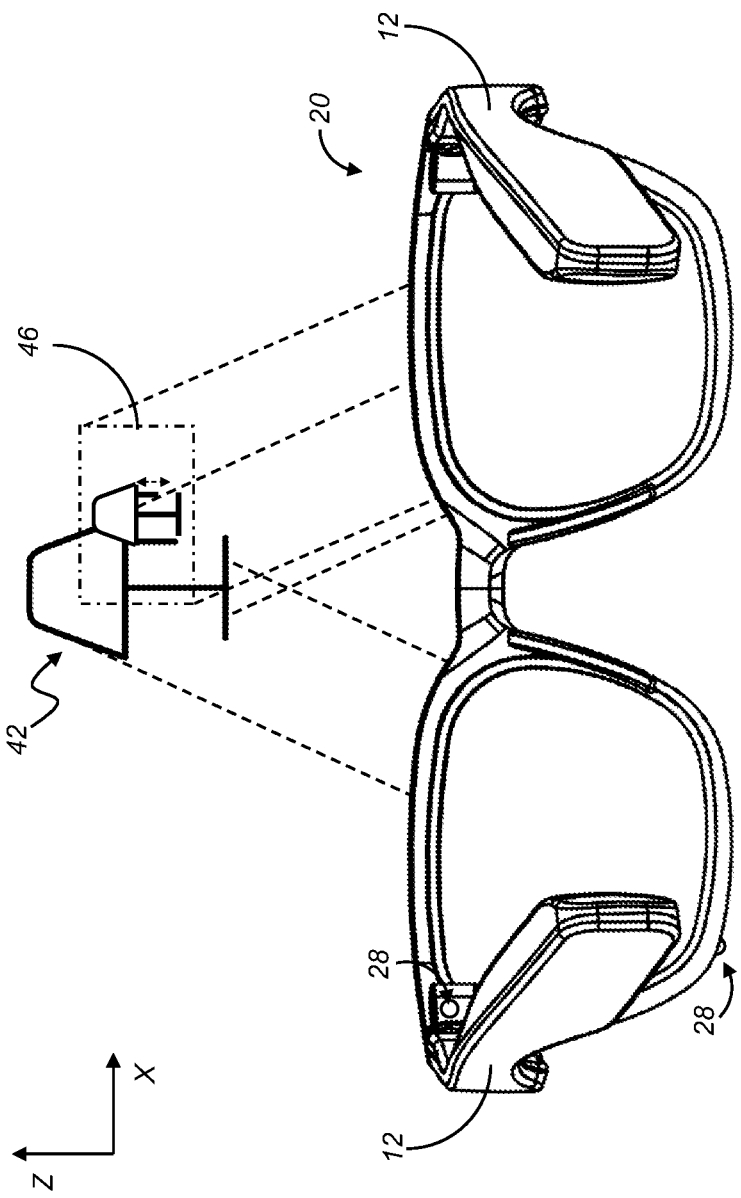
FIG. 2A illustrates a schematic of a camera-generated virtual image of a real world object, as conveyed through a head mounted near-eye display system according to an exemplary embodiment of the presently disclosed subject matter.

In an embodiment, the head mounted near-eye display system 20 may further comprise at least one operator-facing camera 28 situated to view facial movements of the operator 10, including blinking, winks, eye movements, lip movements, facial expressions and the like which may be used to initiate control certain operations on the device, including turning on/off the camera, camera focus, displaying and hiding the virtual image display, annotating a virtual image display, enabling or disabling computer programs, controlling computer programs, enabling or disabling visual guides, controlling visual guides, selecting and controlling menu items on a virtual menu, selecting and controlling networked items and devices 42 in the real world, such as IOT devices and the like. In an embodiment, as illustrated in FIGS. 2A-3, an operator-facing camera 28 is located on the left or right eye assembly 24, 25 eyeglass frame. In FIGS. 2A-3, a first operator-facing camera 28 is shown located adjacent to the left temple arm 12, and a second operator-facing camera 28 is shown located on the lower portion of the left eye assembly 24 eyeglass frame.

Referring now to FIG. 2A, in an embodiment, a real world object 42 is captured by the camera 22 and a virtual image 46 of it is displayed via the head mounted near-eye display system 20. The virtual image 46 is located, in this example, at optical infinity via an eyebox for the right eye generated by the waveguide 100 of the right eye assembly 25 in conjunction with the other optical components of the head mounted near-eye display system 20. In another embodiment, the virtual image 46 is located at optical infinity via an eyebox for the left eye generated by the waveguide 100 of the left eye assembly 24 in conjunction with the other optical components of the head mounted near-eye display system 20. In still another embodiment, the virtual image 46 is located at optical infinity via right eye and left eye waveguides 100 in conjunction with the other optical components of a binocular head mounted near-eye display system 20. The camera 22 is operable to focus upon objects, scan documents and items, read bar codes and other digitally encoded machine-readable optical labels, digitally record a photograph, record video of the real world object 42, and the like. Camera captured imagery may be displayed in the virtual image 46.

Figure 2B:
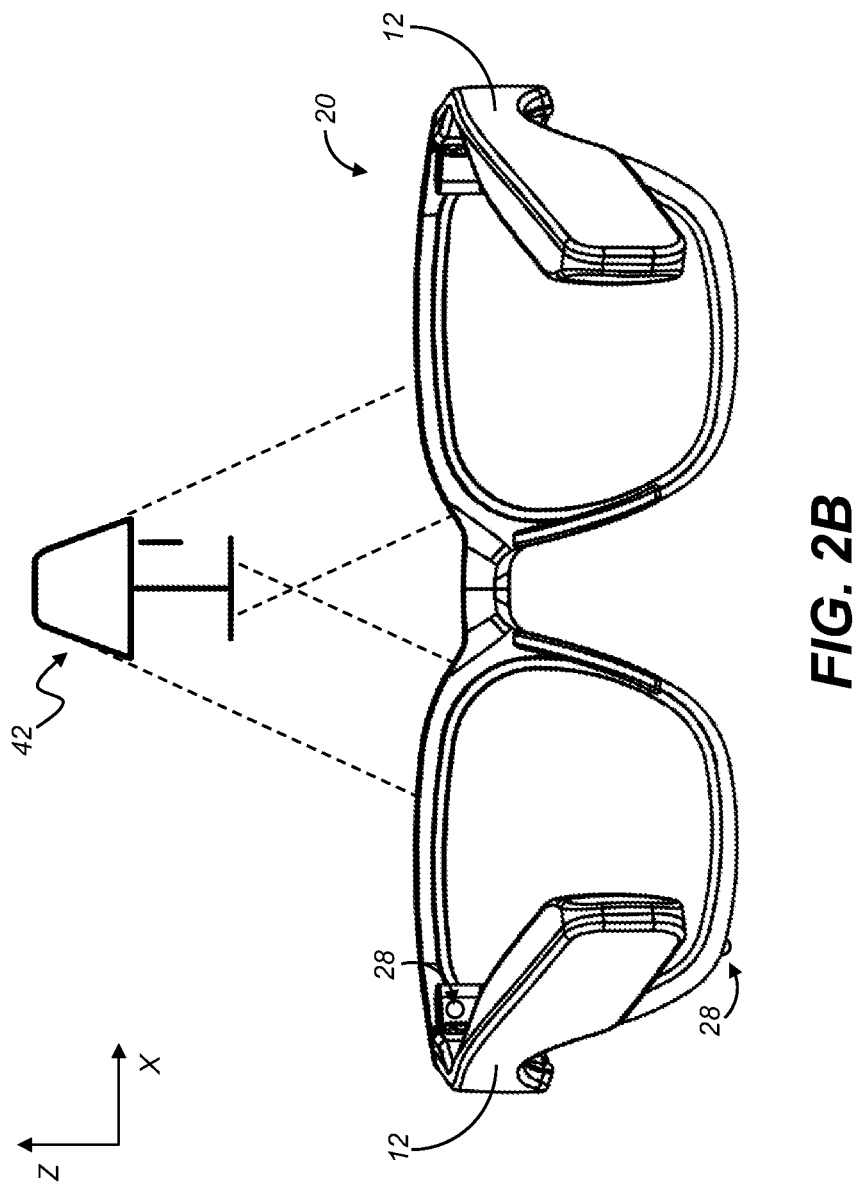
FIG. 2B illustrates a schematic of a real world object, as viewed through a head mounted near-eye display system according to an exemplary embodiment of the presently disclosed subject matter.
Figure 3:
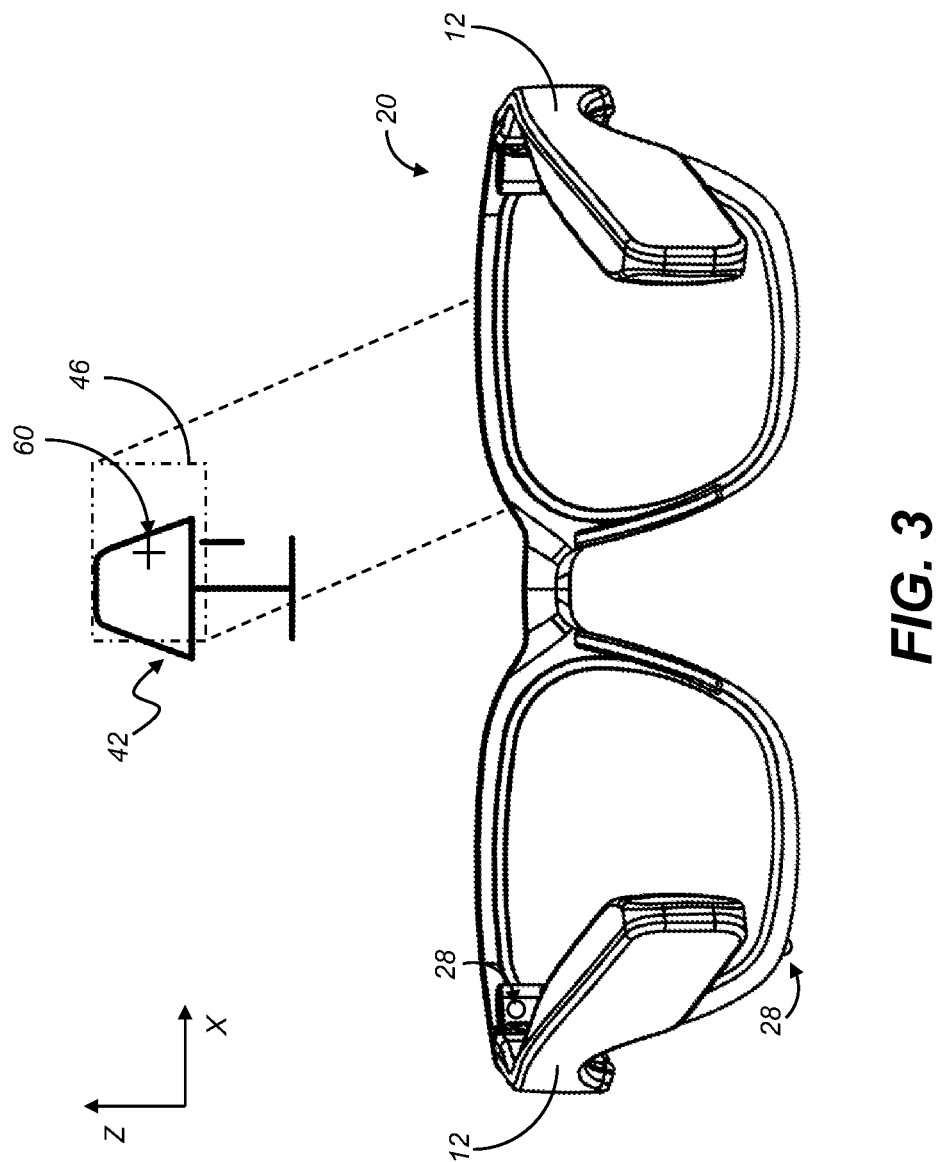
FIG. 3 illustrates a schematic of a real world object, as viewed through a head mounted near-eye display system, and a reticle appearing at optical infinity visually superimposed over the real world object, according to an exemplary embodiment of the presently disclosed subject matter.

In FIG. 2B, the virtual image 46 is disabled, allowing an observer 10 to view the real world object 42 unobstructed. In another embodiment, the head mounted near-eye display system 20 further comprises one or more corrective lenses allowing operator 10 to view the real world as with ordinary corrective glasses.

As illustrated in the embodiment in FIG. 3, a reticle 60 is enabled. The virtual image 46 comprises the reticle 60, the reticle 60 appearing superimposed over the real world object 42. In this example, reticle 60 appears in the center of the virtual image 46 and indicates the center of focus for the camera 22 without obscuring the view of the operator 10.

Figure 4A:
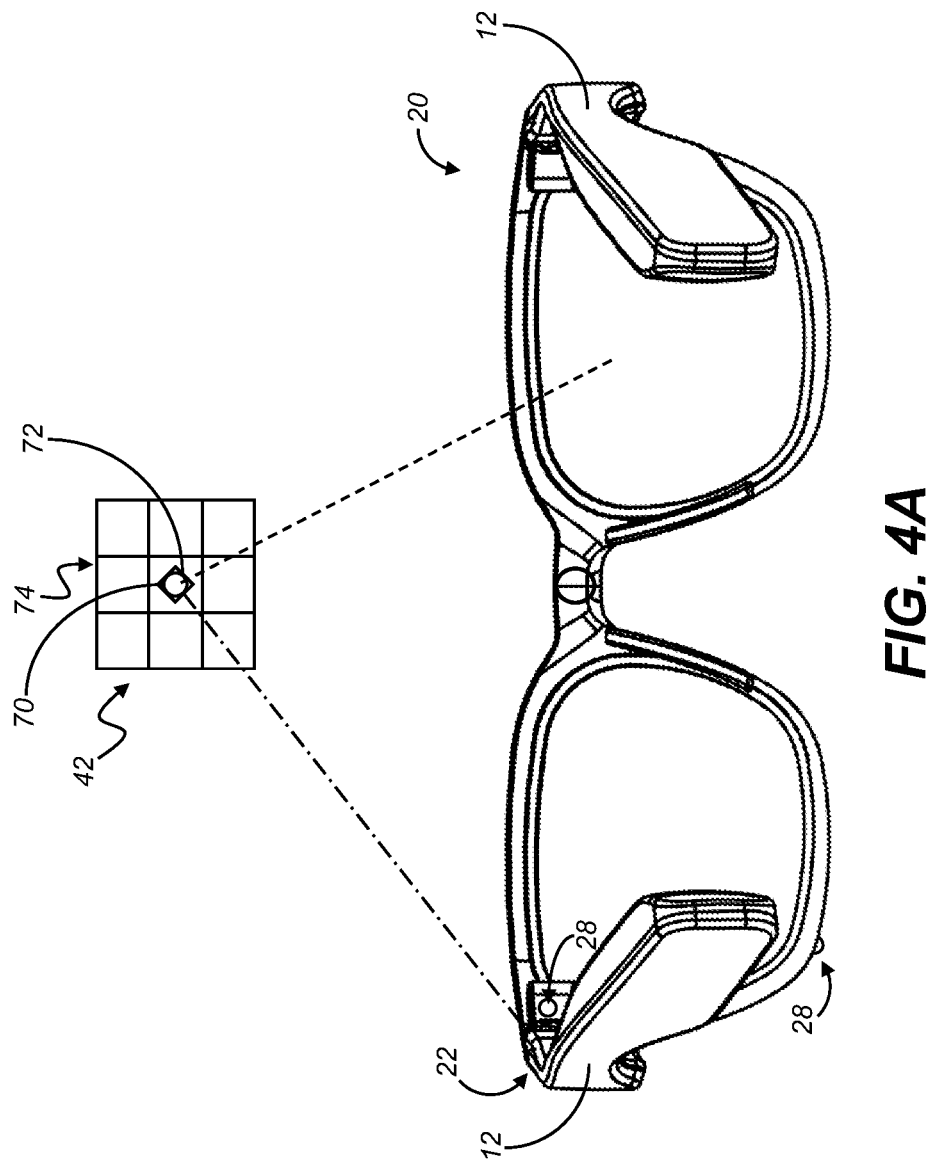
FIG. 4A illustrates a schematic of a focal map, as viewed through a head mounted near-eye display system, with a camera center of focus aligned with an operator center of focus, according to an exemplary embodiment of the presently disclosed subject matter.
Figure 4B:
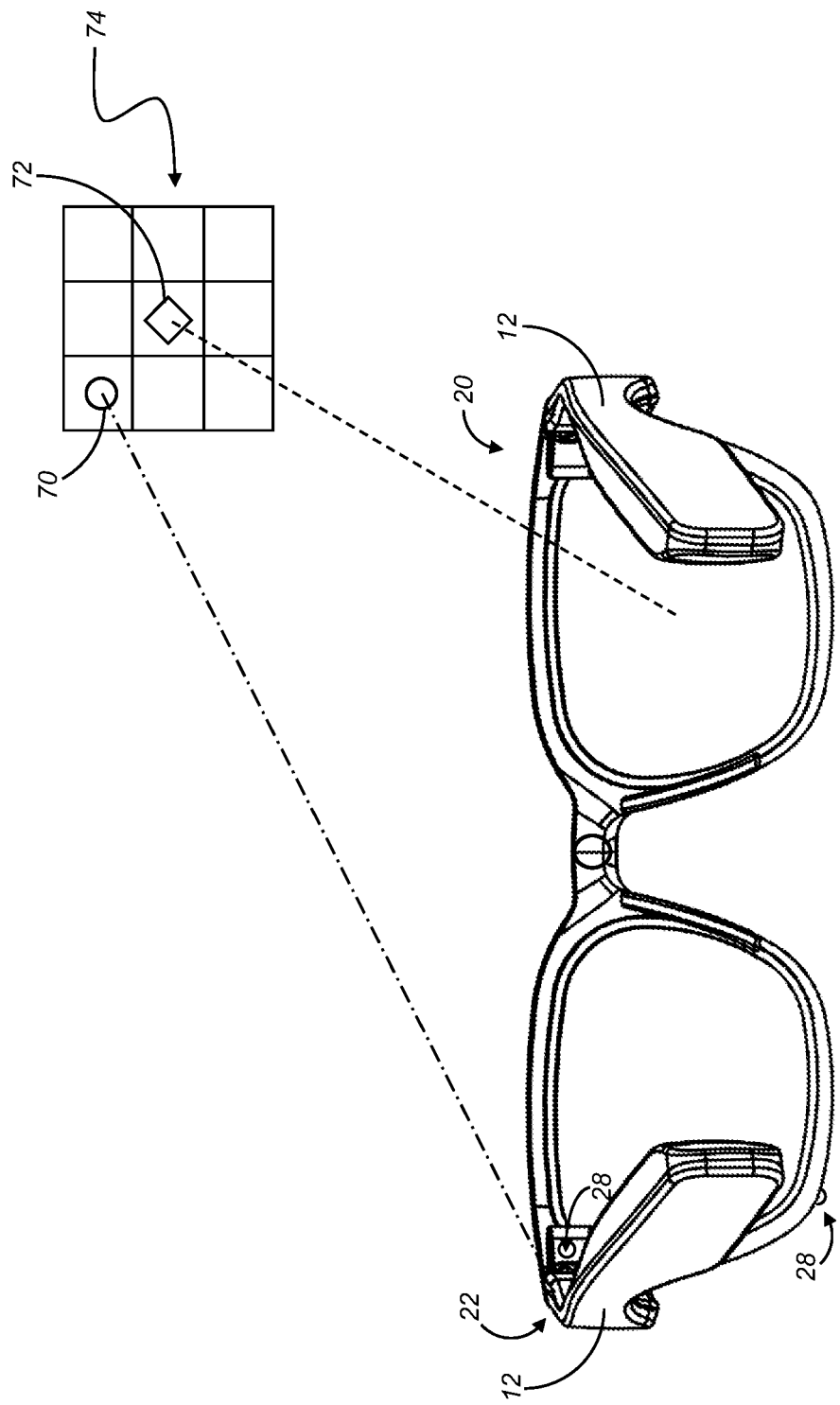
FIG. 4B illustrates a schematic of the focal map according to FIG. 4A shifted in position, showing a misalignment of the camera center of focus and the operator center of focus operable to produce a parallax error.

Referring now to FIGS. 4A-4E, a parallax error may occur when the size, measurement, and/or orientation of an object 42 becomes distorted due to the angle of observation of the operator 10 relative to the camera 22. As shown in FIG. 4A, the camera center of focus 70 and the operator's center of focus 72 are aligned on a focal map 74 including a grid positioned generally orthogonally at a distance in front of the operator 10. However, because the camera 22 is located at a distance from the eye of operator 10, the camera center of focus 70 can differ from the operator's center of focus 72. As shown in FIG. 4B, the position of the subject plane (e.g., the focal map 74) and/or the angle of observation can create parallax errors. With continued reference to FIG. 4B, the operator center of focus 72 may be at the center of the focal map 74 grid, while the camera center of focus 70 is positioned a distance from the operator center of focus 70 in proportion to the distance between the position of the camera 22 and the eye(s) of the operator 10. The position of the camera 22 on the head mounted near-eye display system 20 may therefore present an alignment error.

The head mounted near-eye display system 20 may be utilized to show a preview of an image or images as captured through the camera 22. This preview may reveal parallax errors given the distance from the operator's eye to a camera. However, this preview may obscure part of the operator's field of view and/or draw the operator's attention away from the real world view. As further provided herein, a dynamically positioned reticle 60 may be utilized to account for and reduce/eliminate such parallax errors.

In an embodiment, to ensure mechanical alignment, the head mounted near-eye display system 20 is calibrated based on values from factory tools during manufacture. These values approximate the average distance from the eye of the operator 10 to the camera 22, to provide users with corrected alignment between the camera center of focus 70 and the operator center of focus 72. In an embodiment, the camera 22 center of focus 70 may be aligned to be parallel with the operator's center of focus 72.

Figure 4C:
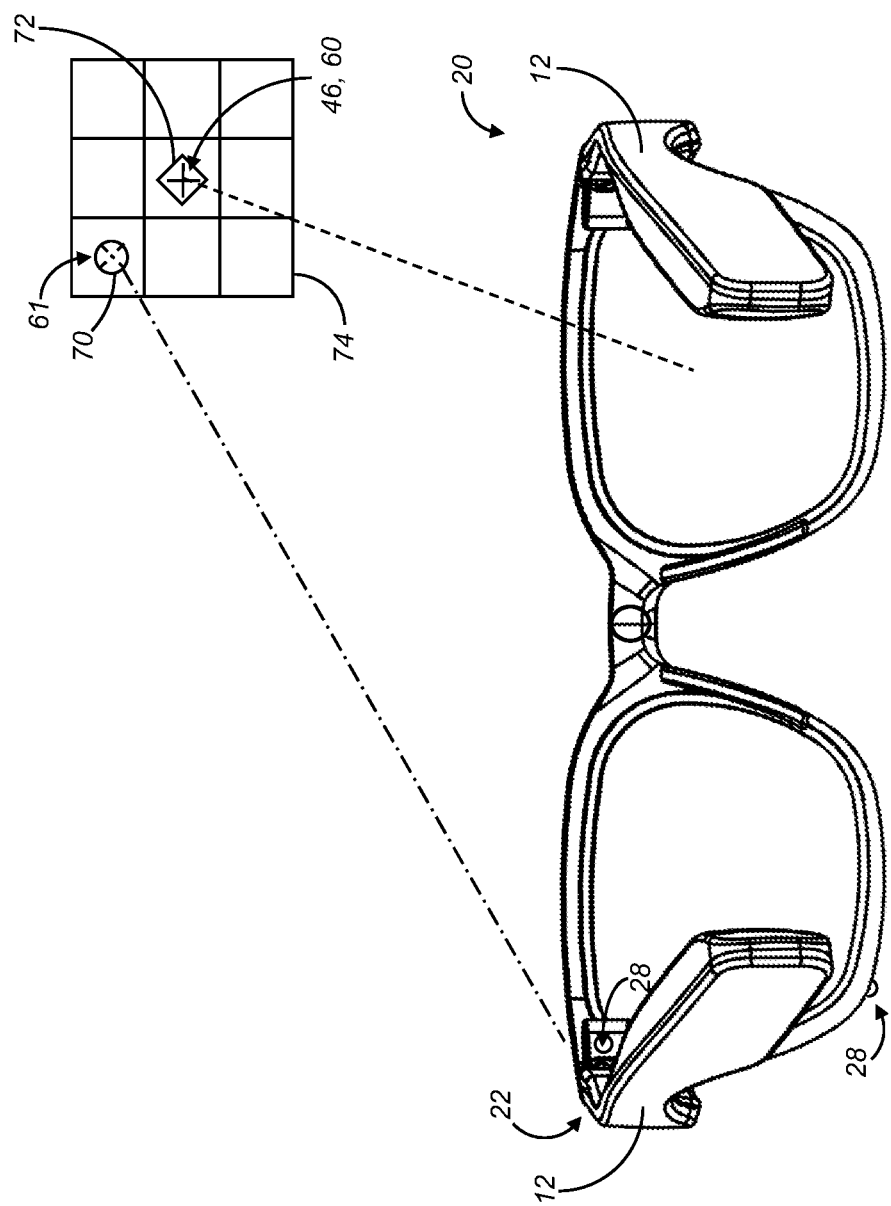
FIG. 4C illustrates a schematic of the focal map according to FIG. 4B, with a virtual image of the focal map affected by parallax error as indicated, inter alia, by a reticle and subreticle, according to an exemplary embodiment of the presently disclosed subject matter.
Figure 4D:
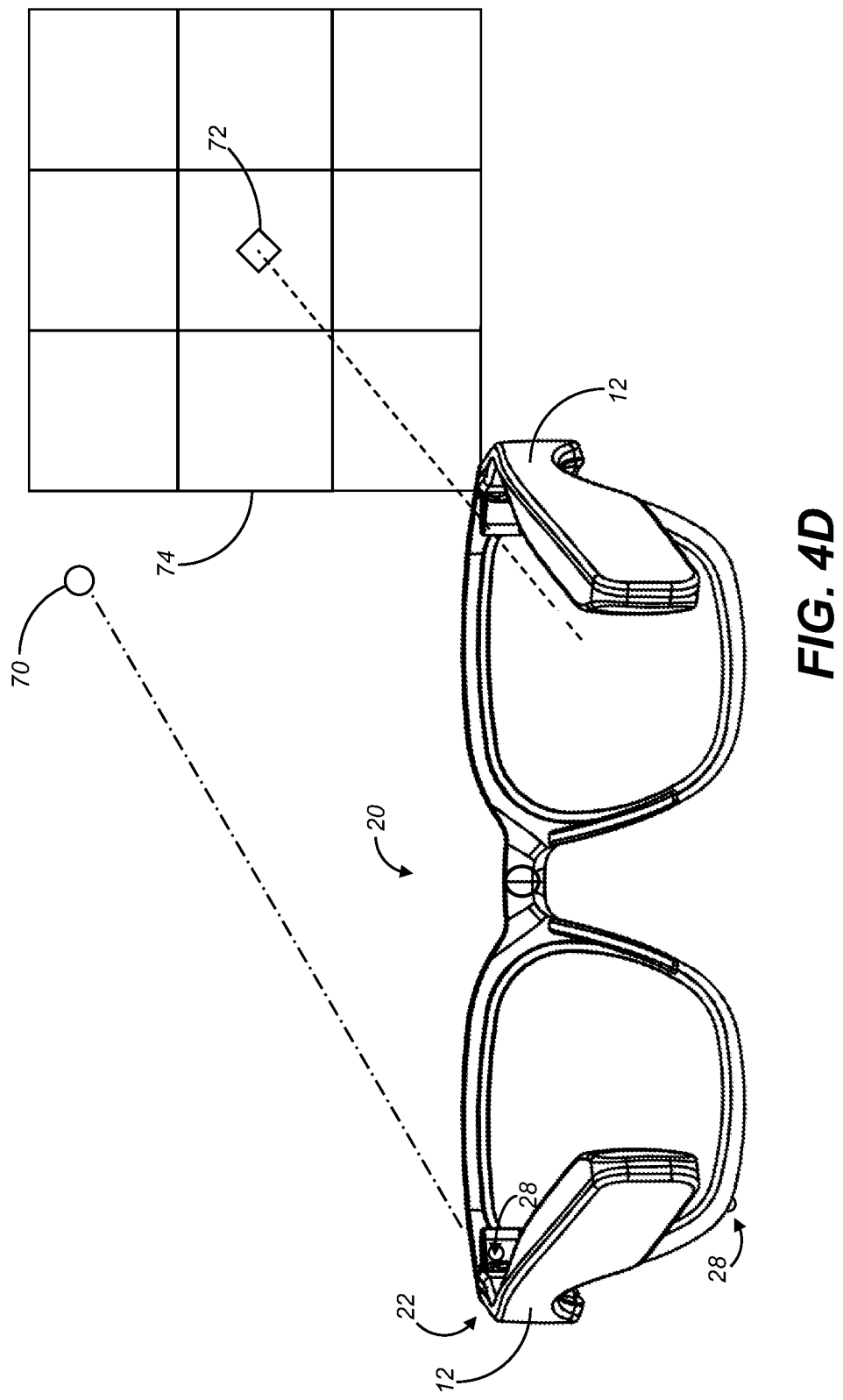
FIG. 4D illustrates a schematic of the focal map according to FIG. 4B positioned closer to the head mounted near-eye display system, showing an increase in parallax error due at least in part to proximity of the focal map to the head mounted near-eye display system.

As illustrated in FIG. 4C, before calibration, the reticle 60 is aligned with the operator center of focus 72 and misaligned with the camera center of focus 70. The subreticle 61 indicates the position of the camera center of focus 70. As illustrated in FIG. 4D, parallax error becomes more pronounced the closer the operator 10 moves to the focal map 74, wherein the camera center of focus 70 moves farther from the operator center of focus 72.

Figure 4E:
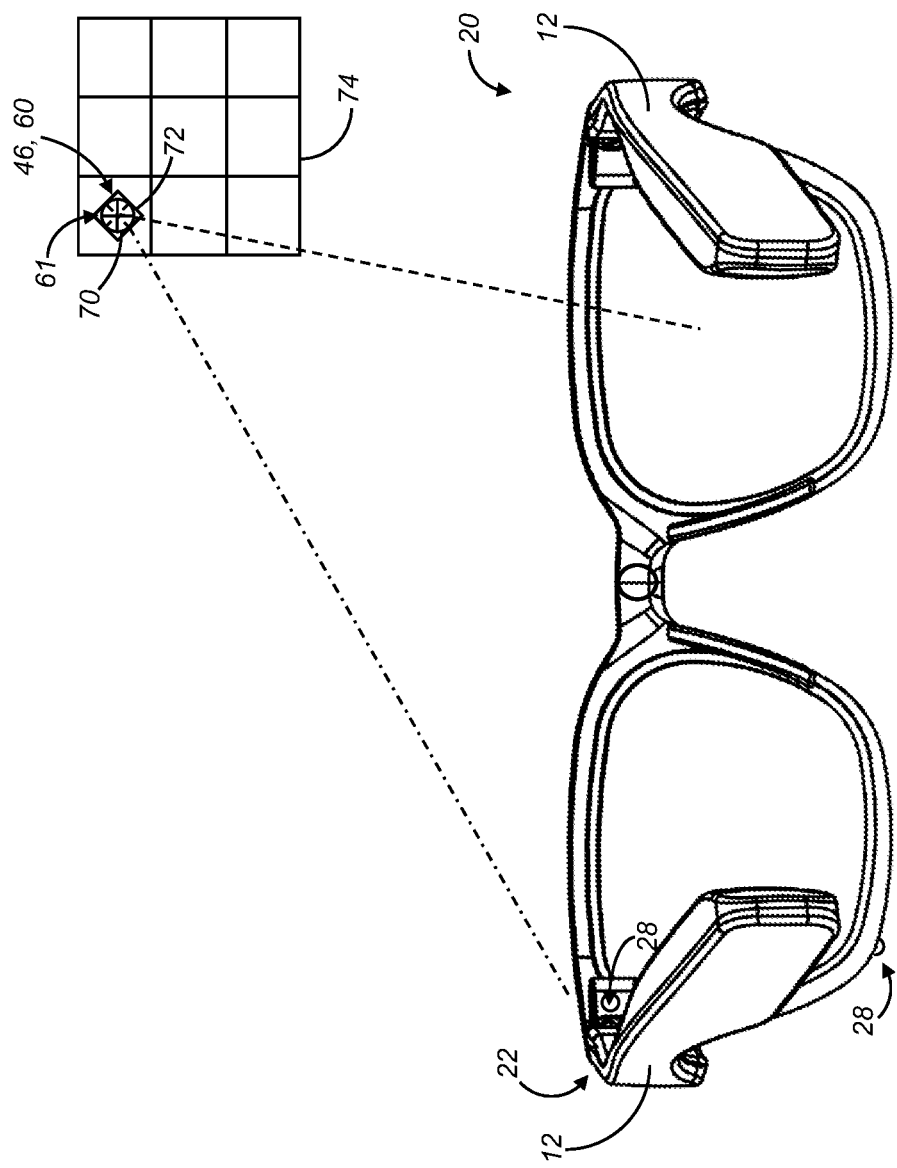
FIG. 4E illustrates a schematic of the focal map according to FIG. 4D, showing an automated alignment correction to account for parallax error according to an exemplary embodiment of the presently disclosed subject matter.

Referring now to FIG. 4E, in an embodiment, the camera 22 is operable to autofocus on objects 42 at a distance from the head mounted near-eye display system 20. In an embodiment, the autofocus system of the camera 22 includes one or more sensors and an actuator in signal communication with the processing unit 18. For example, the autofocus system of the camera 22 may be a passive system operable to focus the camera on the subject plane of an object 42 utilizing contrast measurement of adjacent pixels. To account for parallax errors, the head mounted near-eye display system 20 software is operable to record the movement of the autofocus actuator and shift the position, dynamically, of where the reticle 60 appears in the virtual image 46 as a function of the recorded movement of the autofocus actuator. In an embodiment, the processing unit 18 is operable to calculate and record a distance to the subject plane of the object 42 utilizing a laser autofocus and time-of-flight principle. In another embodiment, the processing unit 18 is operable to calculate and record a distance to the subject plane of the object 42 utilizing the focal distance and optical power of the camera 22. The processing unit 18 may then shift the position of the reticle 60 as a function of the distance from the camera 22 to the subject plane.

Figure 5A:
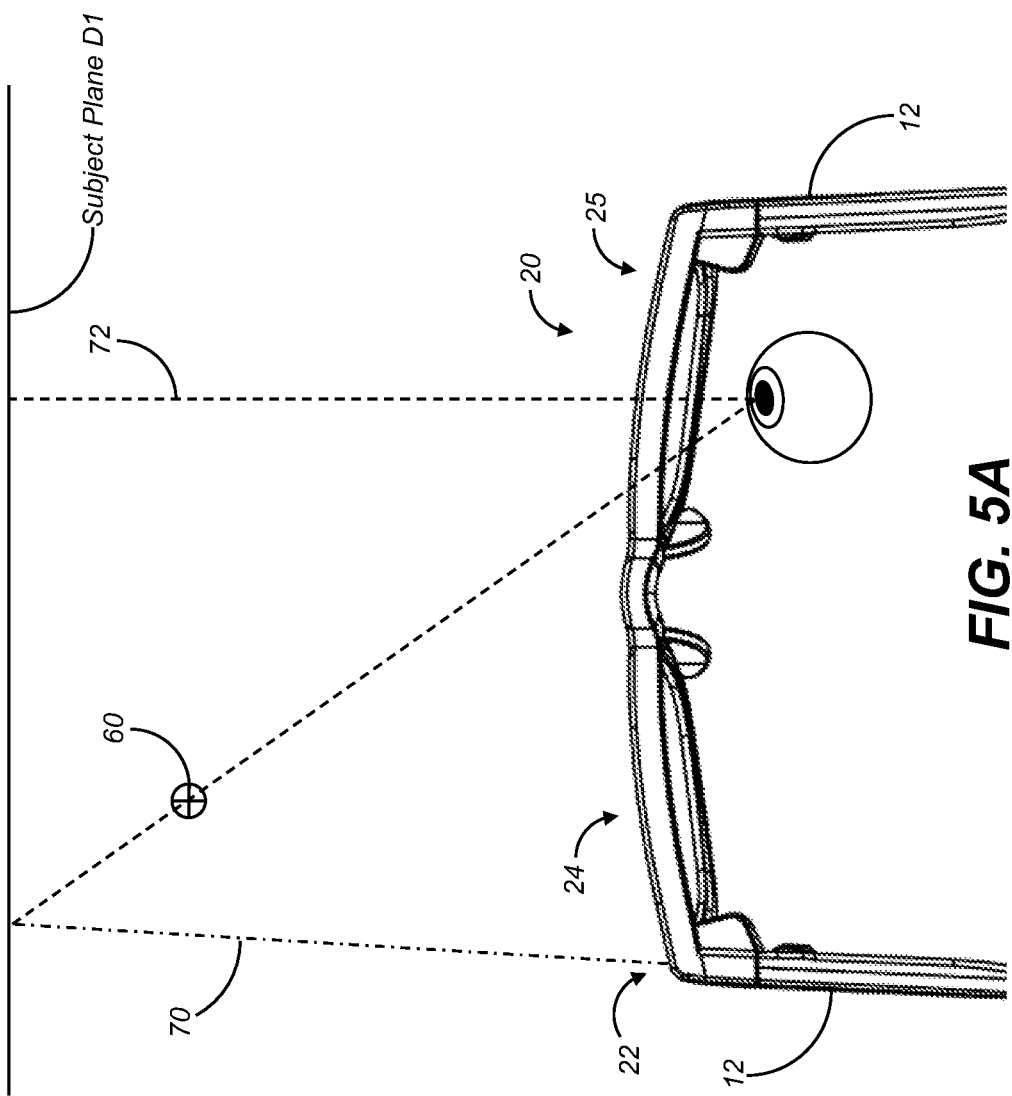
FIG. 5A illustrates a schematic top view of a head mounted near-eye display system having a dynamically positioned reticle operable to account for parallax error according to an exemplary embodiment of the presently disclosed subject matter.
Figure 5B:
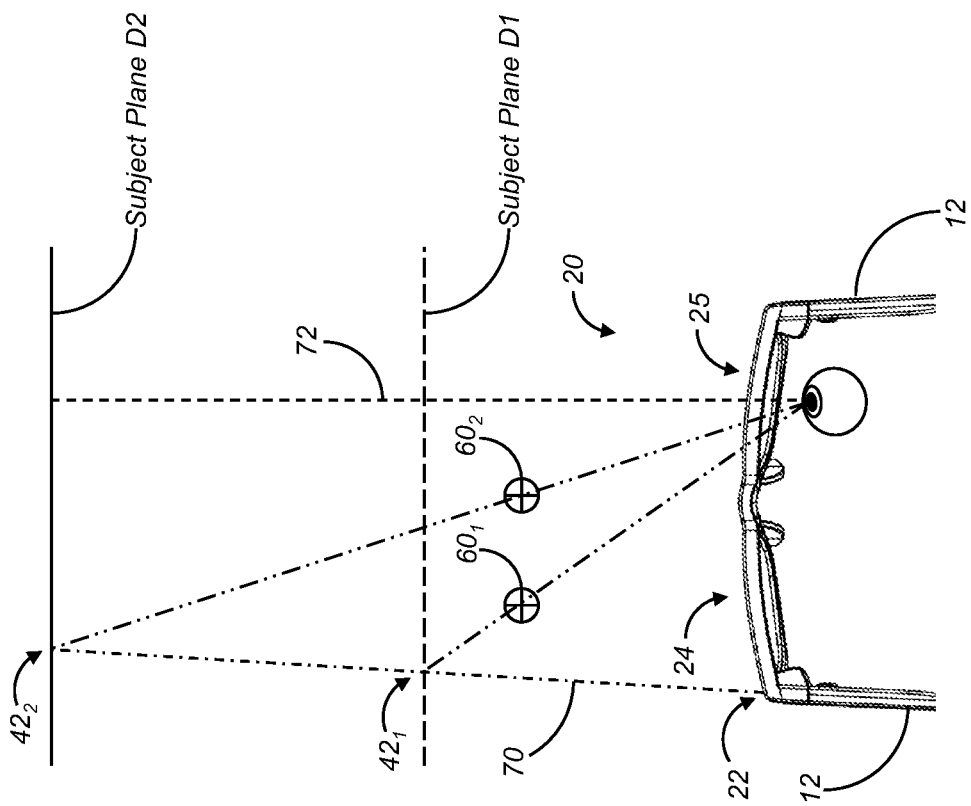
FIG. 5B illustrates a schematic top view of a head mounted near-eye display system having a dynamically positioned reticle operable to account for parallax error according to an exemplary embodiment of the presently disclosed subject matter.

As shown in FIGS. 5A and 5B, when the operator 10 looks at an object 42 at first and second distances from the operator 10 (e.g., subject plane D1 and D2, respectively), the position of the reticle 60 within the virtual image 46 changes as a function of the camera 22 autofocus to account for parallax error. When the camera 22 autofocuses on the subject plane D2 after being focused on the subject plane D1, the position of the reticle 60 changes from the position at reticle 601 to the position at reticle 602.

Dynamically adjusting the position of the reticle 60 to account for parallax error obviates the need for an operator 10 to analyze a preview of the image(s) captured by the camera 22 to ensure the center of focus 70 of the camera 22 is in the desired position. For example, if an operator 10 is utilizing the camera 22 to scan/read barcodes on items located in multiple disparate positions on a warehouse shelving unit, the dynamic positioning of the reticle 60 eliminates a need for the operator 10 to view the camera 22 feed preview in the virtual image 46 for each barcode to ensure the camera center of focus 70 is positioned as desired.

In an embodiment, the operator 10 is able to manually calibrate the position of the reticle 60 with the camera center of focus 70 using a user input device such as, but not limited to, the input button 14, touch sensor 16, the camera 22, and/or verbal commands. The position of the reticle 60 may be manually repositioned to align with the camera center of focus 70 based on visual feedback. In an embodiment, this calibration may be performed at two or more distances. Once calibrated, the relative alignment of the reticle 60 to the camera center of focus 70 may be saved in the processing unit 18 system for future positioning of the reticle 60. In an embodiment, the dynamic positioning of the reticle 60 is a function of the relative alignment of the reticle 60 determined via the one or more manual calibrations and the autofocus of the camera 22.

Figure 6A:
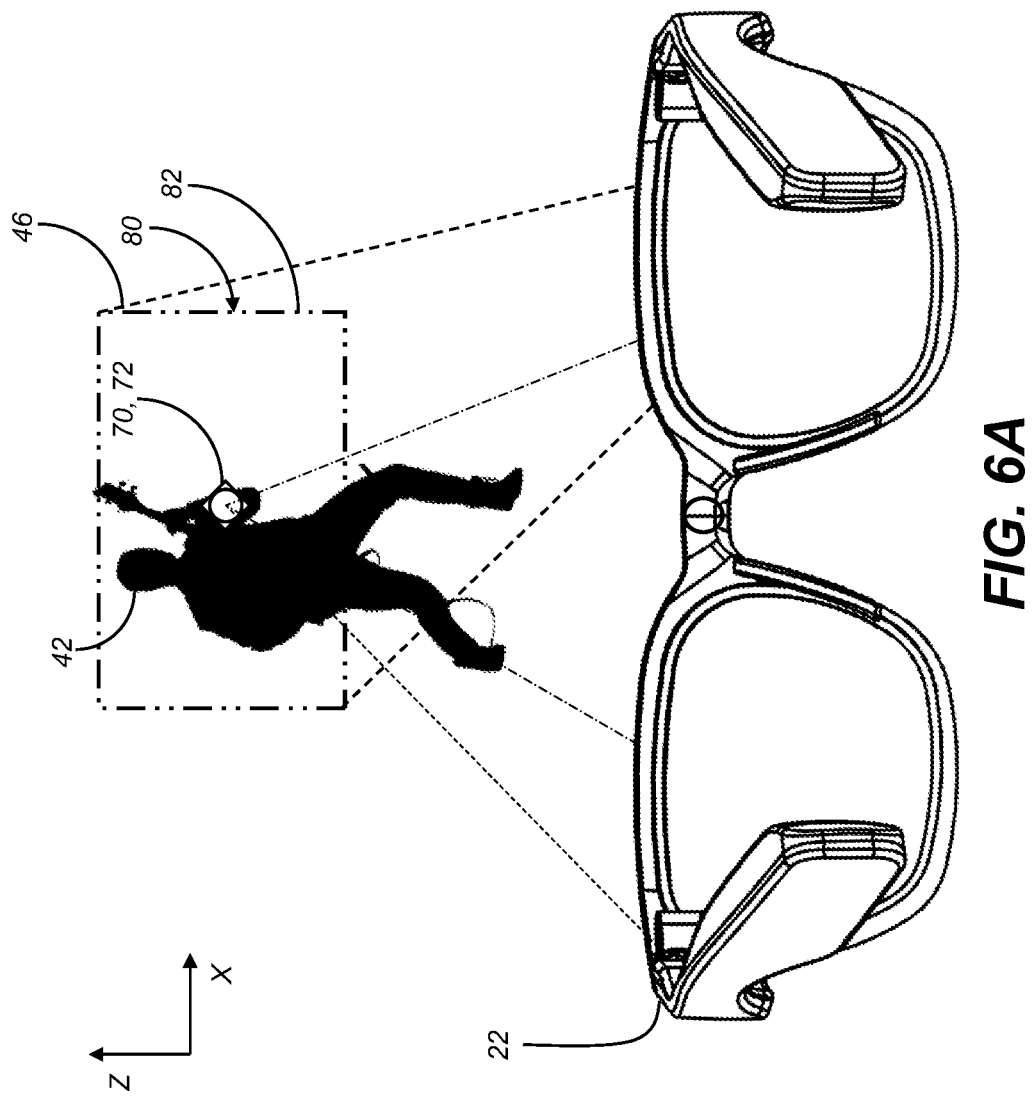
FIG. 6A illustrates a schematic of a real world object, as viewed through a head mounted near-eye display system, and a virtual bounding box visually superimposed over and/or around the real world object, according to an exemplary embodiment of the presently disclosed subject matter.

Referring now to FIG. 6A, the head mounted near-eye display system 20 software enables the visual representation of the reticle 60 to be replaced by a bounding box 80. In this exemplary embodiment, when enabled, the bounding box 80 displays a shape, such as a rectangle, that defines the zoom boundary 82 of the FOV of the camera 22. In another embodiment, the bounding box 80 may display as a square, circle, oval or other shape. In an exemplary embodiment, the bounding box 80 may take a plurality of colors, shadings, border weights and gradient shadings, and may include an assistive element such as a reticle or various camera FOV composition indicators, such as lines of sight, rule of thirds grid, center lines, and the like. Bounding box 80 displays within the virtual image 46 as an overlay or superimposed virtual image.

Figure 6B:
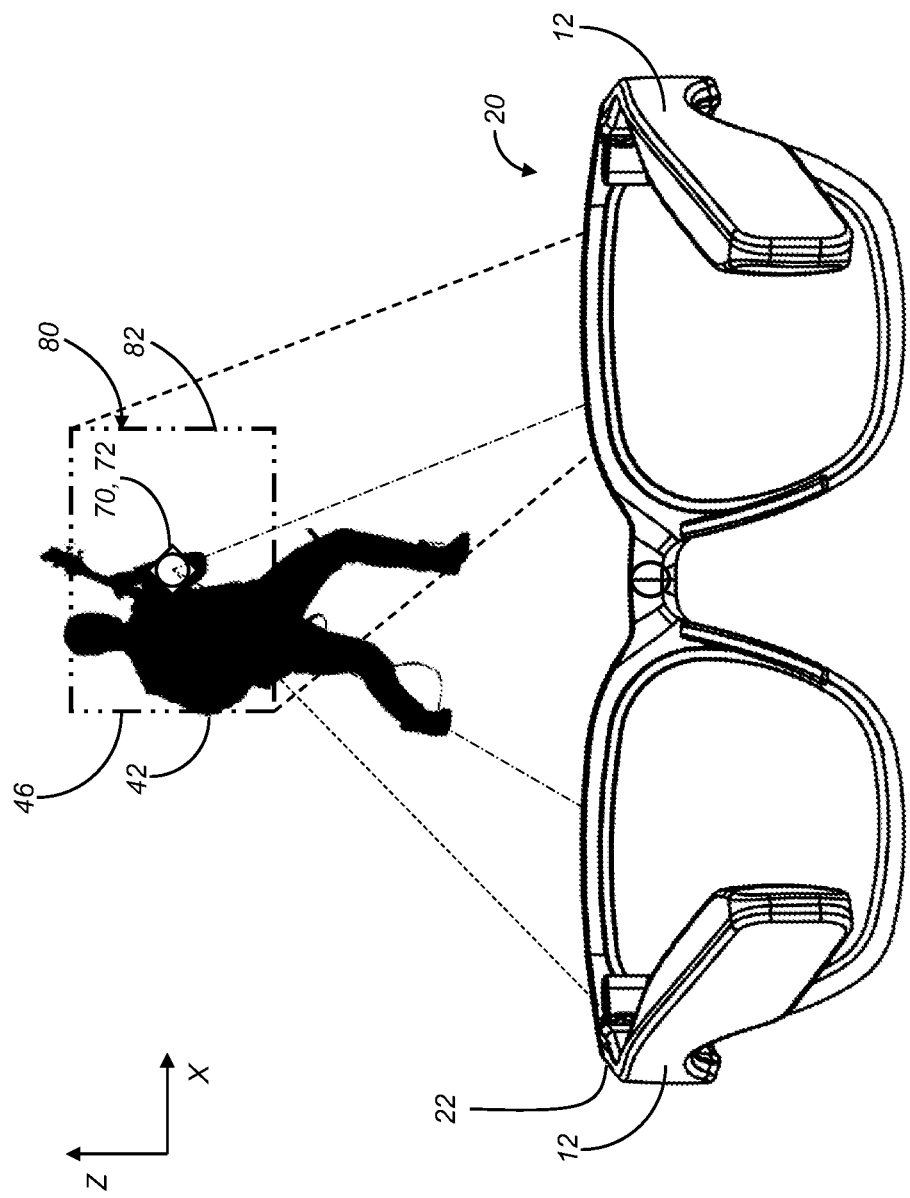
FIG. 6B illustrates a schematic of a real world object, as viewed through a head mounted near-eye display system, and a virtual bounding box visually superimposed over and/or around the real world object indicating a narrowed field of view boundary of a camera, according to an exemplary embodiment of the presently disclosed subject matter.

As illustrated in FIG. 6B, bounding box 80 may change size proportional to the zoom boundary 82. The aspect ratio of bounding box 80 may be set to a plurality of aspect ratios, including, but not limited to, 1:1, 3:2, 4:3, 16:9, and 18:6. The head mounted near-eye display system 20 software may be responsive to the camera 22 to switch to display the bounding box 80 when the camera 22 exceeds a preset hyperfocal distance.

Figure 7:
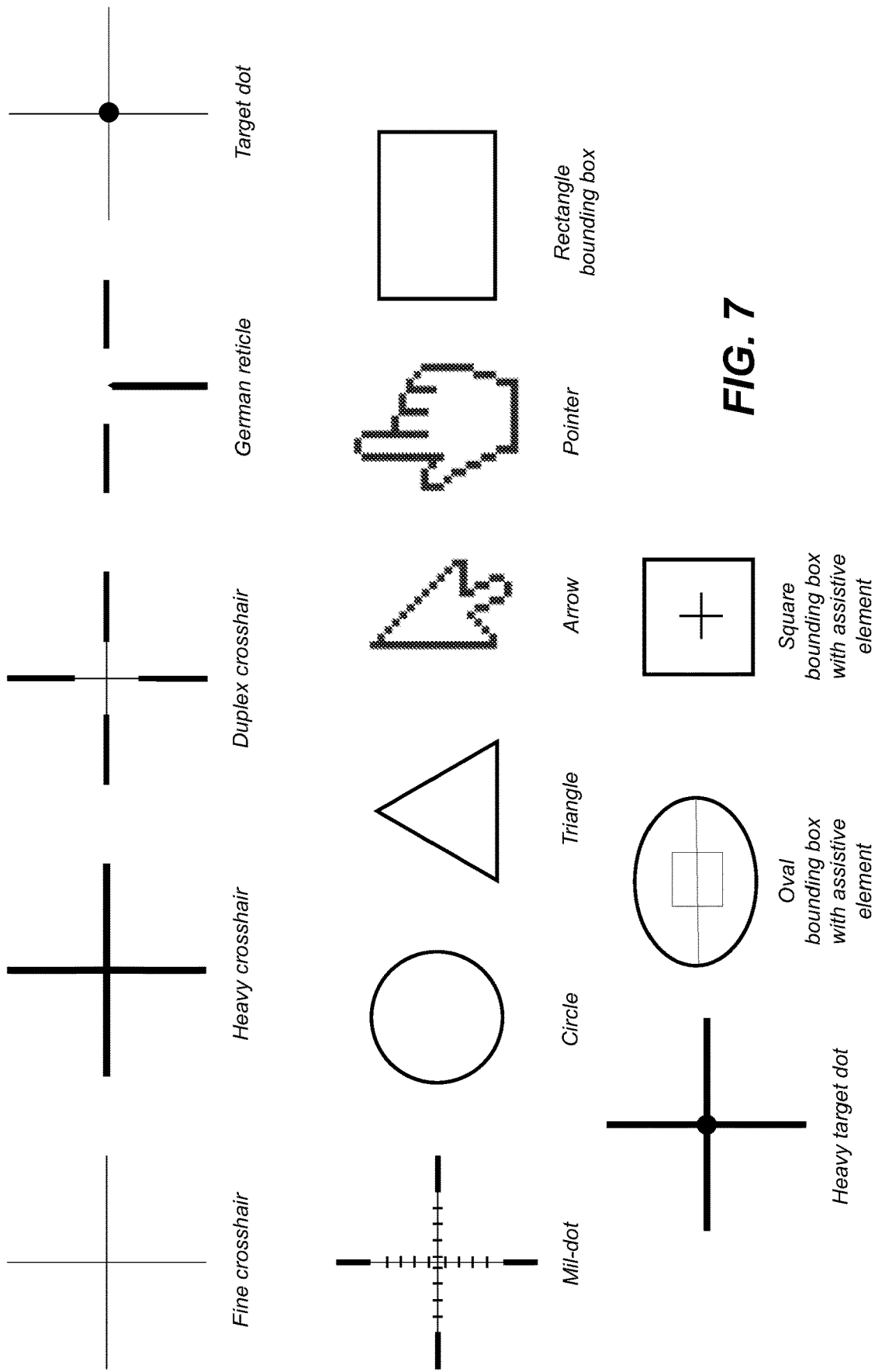
FIG. 7 illustrates a schematic of reticle and bounding box designs according to an exemplary embodiment of the presently disclosed subject matter.

As illustrated in FIG. 7, reticle 60 may take a plurality of shapes, including fine crosshair, heavy crosshair, duplex crosshair, German reticle, target dot, heavy target dot, mildot, circle, triangle, and the like. In an exemplary embodiment, the reticle 60 may take a plurality of colors, shadings, border weights, and gradient shadings. In an exemplary embodiment, the reticle 60 may also take the shape of various camera FOV composition indicators, such as lines of sight, rule of thirds grid, center lines, and the like. The head mounted near-eye display system 20 software allows the operator 10 to toggle between different embodiments of the reticle 60 and bounding box 80.

A code library may be provided wherein third parties may generate, via a system command, various designs of the reticle 60 or bounding box 80. These designs may be included in computer programs or applications developed for generating a virtual image using the head mounted near-eye display system 20. In an exemplary embodiment, the bounding box 80 may also contain the reticle 60 indicating the center of the FOV.

Figure 8:
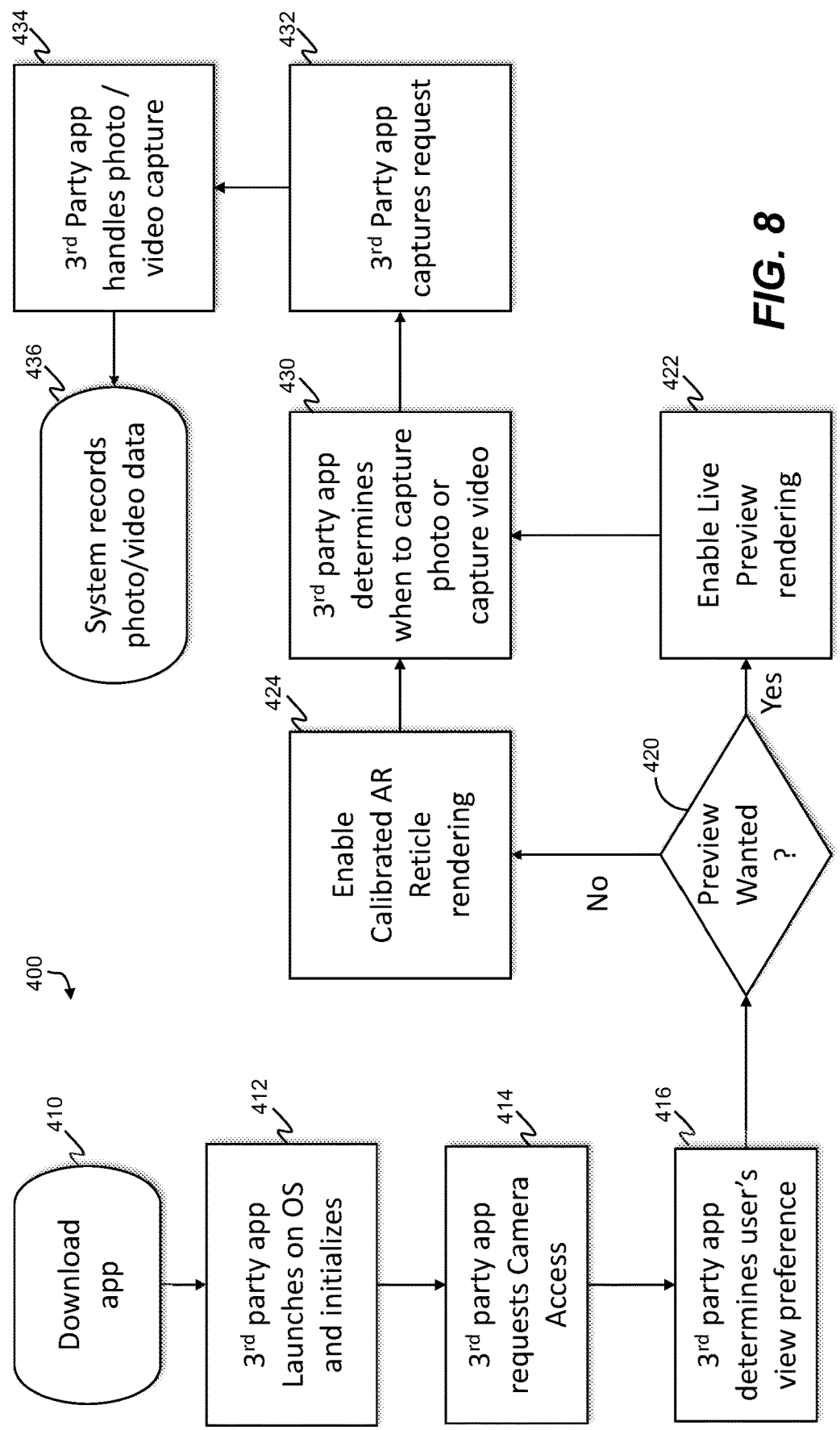
FIG. 8 illustrates a flow diagram for integration of third party reticle software with a head mounted near-eye display according to an exemplary embodiment of the presently disclosed subject matter.

FIG. 8 illustrates a flow diagram 400 of a method wherein third parties may integrate reticle programming into the head mounted near-eye display system 20 software. In step 410 the third party application ("app.") is downloaded to the head mounted near-eye display system 20. In step 412, the third party app. is launched and initialized via a command input by the operator 10. Initialization of the third party app. includes a system call to establish a connection with the hardware on the head mounted near-eye display system 20. As part of this initialization, step 414 includes the third party app. requesting to integrate with the camera 22. In step 416, the third party app. requests operator 10 select preference for the method of interacting with the software. In another embodiment, the third party app. may require use of reticle 60 and disallow a preview via the virtual image 46. Whenever the third party software app. allows an operator 10 choice of preview, step 420 indicates this user request. When a preview is desired, the third party software app. will render a preview through the virtual image 46, as indicated in step 422, instead of displaying the reticle 60. In step 424, the third party software app. follows the operator 10 command to display reticle 60. The head mounted near-eye display system 20 software may be operable to perform, but is not limited to, all basic functions. In step 430, the operator 10 uses the third party app. to capture video or photos using the camera 22 according to capture conditions determined by the third party app. Conditions may include, but are not limited to, external factors such as lighting or the presence of defined external foci, or internal factors defined by the third party app. such as other users being connected to the software, licensing, or connection to a private network. In step 432, the operator 10 initiates a request to capture data. In step 434, the third party app. is operable to perform photo or video capture. Data captured by the head mounted near-eye display system 20 may be saved to the internal processing system of the head mounted near-eye display system 20, as indicated in step 436. In another embodiment, data may be transmitted to other software applications on the head mounted near-eye display system 20.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A head-mounted near-eye display system, comprising:
an image source operable to generate image-bearing light;
a waveguide operable to convey image-bearing light beams from said image source to an eyebox within which a virtual image can be viewed;
a camera connected to said waveguide, wherein said camera has a center of focus; and
a processing unit operable to output signals to said image source, wherein said processing unit is operable to form a reticle within said virtual image via said image source and dynamically position said reticle at said camera center of focus.

2. The head-mounted near-eye display system according to claim 1, further comprising an input device in signal communication with said processing unit, wherein said input device is operable to dynamically control a position of said reticle within said virtual image.

3. The head-mounted near-eye display system according to claim 1, wherein said processing unit is operable to store a relative alignment of said reticle and said camera center of focus.

4. The head-mounted near-eye display system according to claim 1, wherein said processing unit is operable to change a position of said reticle as a function of an autofocus system of said camera.

5. The head-mounted near-eye display system according to claim 4, wherein said processing unit is operable to change said position of said reticle as a function of a distance between said camera and a subject plane determined by said autofocus system.

6. The head-mounted near-eye display system according to claim 4, wherein said processing unit is operable to change said position of said reticle as a function of movement of an actuator of said autofocus system.

7. The head-mounted near-eye display system according to claim 4, wherein said processing unit is operable to store a relative alignment of said reticle and said camera center of focus, and wherein said processing unit is operable to change said position of said reticle as a function of said autofocus system and said stored relative alignment.

8. The head-mounted near-eye display system according to claim 1, wherein:
said camera is in signal communication with said processing unit, wherein said processing unit is operable to form a bounding box within said virtual image via said image source, and
said bounding box represents at least a portion of a field of view of said camera.

9. The head-mounted near-eye display system according to claim 8, further comprising:
an input device in signal communication with said processing unit, wherein said input device is operable to dynamically control a size of said bounding box within said virtual image, wherein a zoom of said camera is operable to change proportional to said bounding box size.

10. The head-mounted near-eye display system according to claim 8, wherein said bounding box comprises a square, rectangle, or oval.

11. A head-mounted near-eye display system, comprising:
an image source operable to generate image-bearing light;
an eye assembly operable to be located within a field of view of an operator's eye;
a transmissive waveguide located within said eye assembly, wherein said transmissive waveguide is operable to convey image-bearing light beams from said image source to an eyebox within which a virtual image can be viewed;
a camera located adjacent to said eye assembly, wherein said camera has a center of focus; and
a processing unit operable to output signals to said image source, wherein said processing unit is operable form a reticle within said virtual image via said image source and dynamically position said reticle at said camera center of focus,
wherein said processing unit is operable to change a position of said reticle as a function of an autofocus system of said camera, and
wherein said processing unit is operable to store a relative alignment of said reticle and said camera center of focus, and wherein said processing unit is operable to change said position of said reticle as a function of said autofocus system and said stored relative alignment.

12. The head-mounted near-eye display system according to claim 11, wherein said processing unit is operable to change an alignment of said virtual image reticle, whereby a parallax error is reduced.

13. A head-mounted display system, comprising:
- a processing unit;
- an image source in signal communication with said processing unit, wherein said image source is operable to generate image-bearing light;
- a near-eye display operable to convey image-bearing light beams from said image source to an eyebox within which a virtual image can be viewed;
- an input device in signal communication with said processing unit; and
- a camera located adjacent to said near-eye display, wherein said camera has a center of focus,
- wherein a position of a reticle within said virtual image is at least partially aligned with said camera center of focus as a function of an average distance between an operator's eye and said camera,
- wherein said input device is operable to control a position of said reticle within said virtual image to align said reticle with said camera center of focus, wherein a relative alignment of said reticle and said camera center of focus is calibrated,
- wherein said processing unit is operable to store said relative alignment of said reticle and said camera center of focus.

14. The head-mounted near-eye display system according to claim 13, wherein said processing unit is operable to change said position of said reticle as a function of said stored relative alignment and a function of an autofocus system of said camera.

15. The head-mounted near-eye display system according to claim 14, wherein said processing unit is operable to change said position of said reticle as a function of a distance between said camera and a subject plane determined by said autofocus system.

16. The head-mounted near-eye display system according to claim 1, further comprising a frame, wherein said waveguide and said camera are connected to said frame.

17. The head-mounted near-eye display system according to claim 13, further comprising a frame, wherein said near-eye display and said camera are connected to said frame.

* * * * *